US010578040B2

(12) United States Patent
Liao-McPherson et al.

(10) Patent No.: US 10,578,040 B2
(45) Date of Patent: Mar. 3, 2020

(54) SMOOTHED AND REGULARIZED FISCHER-BURMEISTER SOLVER FOR EMBEDDED REAL-TIME CONSTRAINED OPTIMAL CONTROL PROBLEMS IN AUTOMOTIVE SYSTEMS

(71) Applicants: TOYOTA MOTOR ENGINEERING & MANUFACTURING NORTH AMERICA, INC., Erlanger, KY (US); THE REGENTS OF THE UNIVERSITY OF MICHIGAN, Ann Arbor, MI (US)

(72) Inventors: Dominic M. Liao-McPherson, Ann Arbor, MI (US); Mike X. Huang, Ann Arbor, MI (US); Ilya Kolmanovsky, Novi, MI (US)

(73) Assignees: TOYOTA MOTOR ENGINEERING & MANUFACTURING NORTH AMERICA, INC., Erlanger, KY (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 184 days.

(21) Appl. No.: 15/705,934

(22) Filed: Sep. 15, 2017

(65) Prior Publication Data
US 2019/0085780 A1    Mar. 21, 2019

(51) Int. Cl.
*G06F 19/00* (2018.01)
*F02D 41/14* (2006.01)
(Continued)

(52) U.S. Cl.
CPC .......... *F02D 41/1401* (2013.01); *F02B 37/24* (2013.01); *F02D 41/005* (2013.01);
(Continued)

(58) Field of Classification Search
CPC .......... B60W 10/06; F02D 35/0015; F02D 41/0047; F02D 41/005; F02D 41/0052;
(Continued)

(56) References Cited

U.S. PATENT DOCUMENTS

| 4,899,282 A | * | 2/1990 | Holmes | F02D 41/1408 |
| | | | | 123/406.24 |
| 5,642,722 A | * | 7/1997 | Schumacher | F02D 41/047 |
| | | | | 123/480 |

(Continued)

OTHER PUBLICATIONS

P. Patrinos, et al. "An Accelerated Dual Gradient-Projection Algorithm for Embedded Linear Model Predictive Control", IEEE Transactions on Automatic Control, vol. 59, No. 1, Jan. 2014, pp. 18-33 (16 pages).

(Continued)

*Primary Examiner* — John Kwon
(74) *Attorney, Agent, or Firm* — Oblon, McClelland, Maier & Neustadt, L.L.P.

(57) ABSTRACT

System for controlling an internal combustion engine having a variable geometry turbocharger, an EGR valve and an EGR throttle. The system includes a controller and an engine. In each sampling period, the controller inputs sensor values and estimators that are calculated based on the sensor values and dynamic models and records the sensor values and the estimators in a memory of the controller. The controller incorporates the sensor values and the estimators into conditions for optimality associated with a constrained optimal control problem, maps the conditions for optimality to a non-smooth system using Fischer-Burmeister function, performs Newton method iterations on a smoothed system approximating the non-smooth system in order to converge on a solution, and issues commands that control the EGR valve, the EGR throttle and the variable geometry turbocharger during engine operation.

15 Claims, 7 Drawing Sheets

(51) Int. Cl.
*F02M 26/05* (2016.01)
*F02D 41/00* (2006.01)
*F02B 37/24* (2006.01)
*G05B 13/04* (2006.01)

(52) U.S. Cl.
CPC ..... *F02D 41/0007* (2013.01); *F02D 41/0077* (2013.01); *F02D 41/1406* (2013.01); *F02M 26/05* (2016.02); *G05B 13/048* (2013.01); *F02D 41/0072* (2013.01); *F02D 2041/1412* (2013.01); *F02D 2041/1433* (2013.01)

(58) Field of Classification Search
CPC ............. F02D 41/0062; F02D 41/0072; F02D 2041/0067; F02D 2041/007; F02D 2041/0075; F02D 2011/101; F02D 41/0077; F02M 26/49; F02M 26/00; F02M 26/05; F02M 26/52
USPC ..... 701/101, 108, 114, 115; 123/319, 339.1, 123/352, 360, 361, 568.11, 568.26
See application file for complete search history.

(56) References Cited

U.S. PATENT DOCUMENTS

| | | | | |
|---|---|---|---|---|
| 5,657,737 | A * | 8/1997 | Ishida | F02D 41/047 |
| | | | | 123/674 |
| 7,389,173 | B1 * | 6/2008 | Wang | F01N 3/0842 |
| | | | | 60/602 |
| 8,346,416 | B2 | 1/2013 | Liu et al. | |
| 10,309,287 | B2 * | 6/2019 | Pachner | F01N 3/208 |
| 2007/0079605 | A1 | 4/2007 | Hu et al. | |
| 2012/0103304 | A1 * | 5/2012 | Kang | F02D 35/023 |
| | | | | 123/305 |
| 2013/0035842 | A1 * | 2/2013 | Sasaki | F02D 41/1455 |
| | | | | 701/109 |
| 2014/0358355 | A1 | 12/2014 | Zimmerschied | |
| 2015/0377156 | A1 * | 12/2015 | Hagari | F02D 41/0007 |
| | | | | 60/602 |
| 2016/0025028 | A1 | 1/2016 | Vaughan | |
| 2017/0218860 | A1 * | 8/2017 | Pachner | F02D 41/1401 |
| 2018/0149064 | A1 * | 5/2018 | Pachner | F01N 3/208 |
| 2018/0355814 | A1 * | 12/2018 | Magner | F02D 41/221 |

OTHER PUBLICATIONS

Y. Wang, et al. "Fast Model Predictive Control Using Online Optimization", IEEE Transactions on Control Systems Technology, vol. 18, No. 2, Mar. 2010. pp. 267-278 (12pages).
M. Brand, et al. "A Parallel Quadratic Programming Algorithm for Model Predictive Control", Mitsubishi Electric Research Laboratories, http://www.merl.com, TR2011-056, Aug. 2011 (11 pages).
A. Bemporad, "A Quadratic Programming Algorithm Based on Nonnegative Least Squares With Applications to Embedded Model Predictive Control", IEEE Transactions on Automatic Control, vol. 61, No. 4, Apr. 2016 pp. 1111-1116 (6 pages).
A. Fisher, "A Special Newton-Type Optimization Method," Optimization, vol. 24, No. 3-4, pp. 269-284, 1992.
C. Kanzow, "Some Noninterior Continuation Methods for Linear Complementarity Problems," SIAM Journal on Matrix Analysis and Applications, vol. 17, No. 4, pp. 851-868, 1996.
X. Chen, L. Qi, and D. Sun, "Global and Superlinear Convergence of the Smoothing Newton Method and its Application to General Box Constrained Variational Inequalities," Mathematics of Computation of the American Mathematical Society, vol. 67, No. 222, pp. 519-540, 1998.
J.-S. Chen and S. Pan, "A Family of NCP Functions and a Descent Method for the Nonlinear Complementarity problem," Computational Optimization and Applications, vol. 40, No. 3, pp. 389-404, 2008.
A.F. Izmailov and M.V. Solodov, Newton-type Methods for Optimization and Variational Problems. Springer, 2014.
L. Qi and J. Sun, "A Nonsmooth Version of Newton's Method," Mathematical Programming, vol. 58, No. 1, pp. 356-367, 1993.
C.T. Kelley, "Iterative Methods for Linear and Nonlinear Equations," SIAM, Philadelphia, 1995.
C.T. Kelley, Iterative Methods for Optimization. SIAM, 1999.

* cited by examiner

$$\min_{u,s} \quad J(u,s) = \overset{❹}{-\beta\eta_N + \gamma_n\|s_n\|_2^2} + \overset{❺}{\gamma_\phi s_\phi} + \sum_{i=0}^{N-1} \overset{❶}{-\beta\eta_i} + \overset{❷}{\|\Delta u_i\|_R^2} + \overset{❸}{\alpha(q_r - q_i)}$$

$$s.t \quad ❻ \; x_{i+1} = f(x_i, u_i, \rho_k), \quad i = 0..N-1$$
$$❼ \; \ln(\theta_{f,i}) - \ln(\theta_l) \leq s_{n,i}, \quad i = 0..N-1$$
$$❽ \; \phi_i - \phi_l \leq s_\phi, \quad i = 0..N-1$$
$$❾ \; u^- \leq u_i \leq u^+, \quad i = 0..N-1$$
$$❿ \; s_{n,i} \geq 0, \quad i = 0..N-1$$
$$s_\phi \geq 0.$$

❶ Efficiency  ❻ Dynamics
❷ Damping  ❼ NOx constraint
❸ Torque tracking  ❽ FAR constraint
❹ NOx penalty  ❾ Control constraint
❺ FAR penalty  ❿ Slack positivity

SMOOTHED AND REGULARIZED FISCHER-BURMEISTER SOLVER FOR EMBEDDED REAL-TIME CONSTRAINED OPTIMAL CONTROL PROBLEMS IN AUTOMOTIVE SYSTEMS

FIELD OF DISCLOSURE

The present disclosure relates generally to methods and controls for internal combustion engines and, more particularly, to methods for controlling diesel engines. The methods and controls apply a Regularized and Smoothed Fischer Burmeister technique to model predictive control in order to control an engine in real time.

BACKGROUND

Modern diesel engines use variable geometry turbines (VGT) to increase the amount of air supplied to the engine cylinders. The VGT varies the angle of the turbine stator inlet vanes to change the amount of air supplied to the engine cylinders. In addition to providing optimum performance and fuel economy, modern diesel engines must also meet stringent federal regulations on emissions, particularly, particulate matter and nitrogen oxides. In order to meet all of these requirements, diesel engines with a VGT also use an exhaust gas recirculation (EGR) valve that has a variable controlled position to recirculate varying amounts of engine exhaust gases back into the engine cylinders to lower temperature of combustion, reduce NOx production and reduce engine emissions. As the engine operates over a large range of operating conditions, including engine speed, fuel usage, engine load, etc., one and typically multiple controllers are embedded in the engine control unit (ECU) to control various engine actuators in response to sensors detecting engine performance in order to optimize engine performance, and emissions.

An important example of a real-time, embedded optimization problem is model predictive control (MPC), where an optimal control problem over a receding horizon is solved during each sampling period. See L. Grüne and J. Pannek, "Nonlinear model predictive control," in *Nonlinear Model Predictive Control*, pp. 43-66, Springer, 2011; J. B. Rawlings and D. Q. Mayne, *Model predictive control: Theory and design*. Nob Hill Pub., 2009; and G. C. Goodwin, M. M. Seron, and J. A. De Doná, *Constrained control and estimation: an optimisation approach*. Springer Science & Business Media, 2006, each incorporated herein by reference in their entirety. The optimal control problem for a discrete time linear-quadratic MPC formulation can be expressed as a convex QP. Furthermore, convex QPs form the basis for many algorithms used in nonlinear model predictive control (NMPC) such as sequential quadratic programming (SQP), or the real-time iteration scheme which solves just one QP per timestep. See P. T. Boggs and J. W. Tolle, "Sequential quadratic programming," *Acta numerica*, vol. 4, pp. 1-51, 1995; S. Gros, M. Zanon, R. Quirynen, A. Bemporad, and M. Diehl, "From linear to nonlinear mpc: bridging the gap via the real-time iteration," *International Journal of Control*, pp. 1-19, 2016; and M. Diehl, H. G. Bock, J. P. Schlöder, R. Findeisen, Z. Nagy, and F. Allgöwer, "Real-time optimization and nonlinear model predictive control of processes governed by differential-algebraic equations," *Journal of Process Control*, vol. 12, no. 4, pp. 577-585, 2002, each incorporated herein by reference in their entirety.

The use of Model Predictive Control (MPC) is growing for engine control. For example, the rate-based MPC approach incorporates integral type action to guarantee zero steady state error by adding additional integral states to the predictive control model. The MPC model uses a number of different engine operating ranges (fuel rate and engine speed), and develops a controller for each range to control the engine actuators.

In a specific example of model predictive control applied to diesel engine airflow, the flows in the engine are controlled using the variable geometry turbine (TGT), EGR throttle, and an EGR valve actuator. These systems are strongly coupled and are highly non-linear.

However, existing methods for constrained optimal control in embedded automotive applications have been unable to perform required calculations within a time period necessary for real-time control. In a control system for a diesel engine, the Engine Control Unit (ECU) samples input signals, records measurements from sensors, performs calculations and issues commands. To accomplish real-time control, all of these operations must be performed within the sampling period. In particular, the ECU is given a fixed percentage of the sampling period to complete all required calculations, referred to as a computational budget.

In recent years a significant amount of research into developing fast, reliable algorithms for solving both QPs and more general optimization problems online has significantly advanced the state of the art. However, managing the computational burden of online optimization algorithms remains a challenge.

It would be desirable to provide a model predictive controller for use with internal combustion engine, which is fast enough to accomplish all required calculations within the computational budget.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to techniques for constrained optimization applied to embedded model predictive control in a diesel engine.

Figure 1:
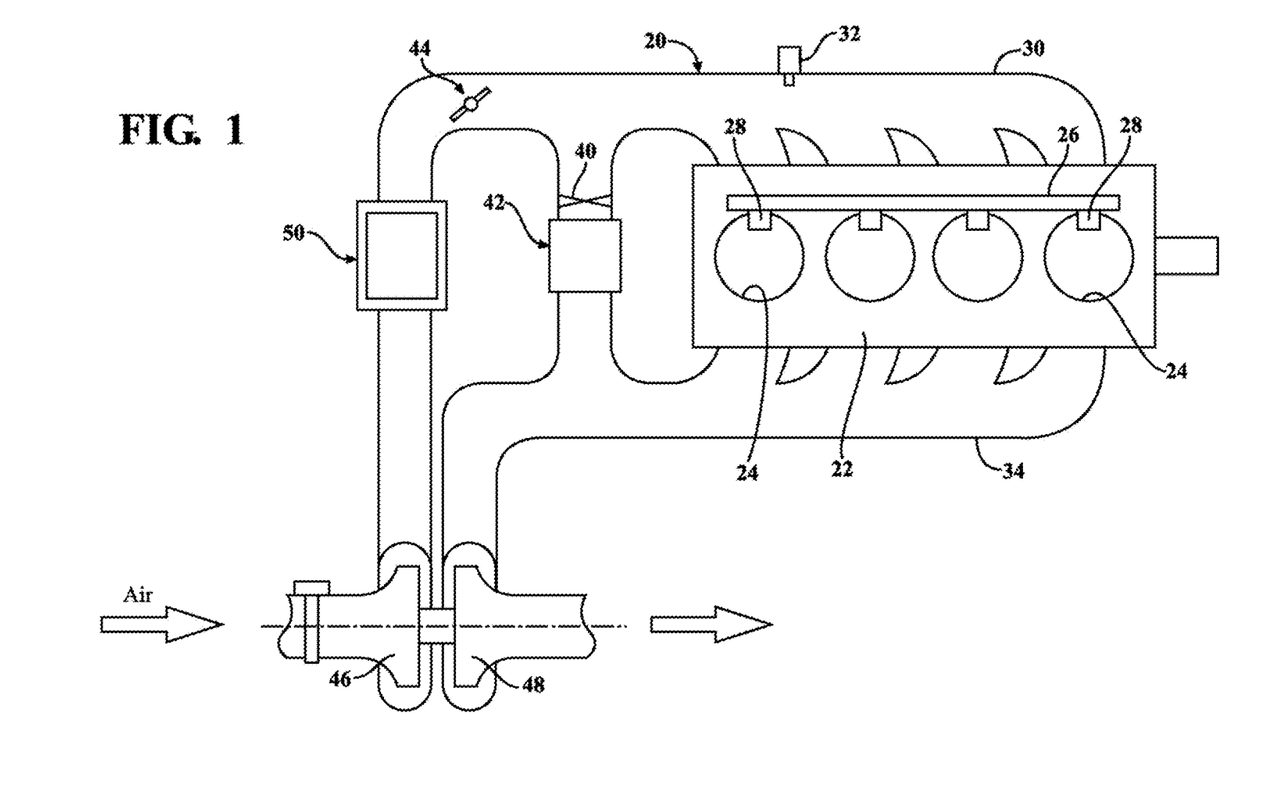
FIG. 1 is a schematic representation of a diesel engine.

Referring to FIG. 1, an internal combustion engine 20, described hereafter by example as a diesel engine, includes an engine block 22 housing a plurality of cylinders 24. A fuel rail 26 connected to a fuel supply supplies diesel fuel to a plurality of fuel injectors 28 with one fuel injector provided for each cylinder 24. An intake manifold 30 is coupled to the cylinders 24 for supplying intake air to each cylinder. An intake manifold pressure sensor 32 is coupled to the intake manifold 30 for measuring intake manifold air pressure. An exhaust manifold 34 carries combustion gases from the cylinders 24 away from the engine block 22.

An Exhaust Gas Recirculation (EGR) valve 40 is coupled in a bypass path between the intake manifold 30 and the exhaust manifold 34 to recirculate a portion of the exhaust gases from the exhaust manifold 34 back into the intake manifold 32 for supply to the cylinders 24. An EGR cooler 42 may be coupled in the bypass path along with the EGR valve 40. An EGR throttle 44 is mounted in the airflow path from the compressor 46 of the variable geometry turbine (VGT) 48 to control gas circulation. An intercooler 50 may be mounted in the intake air path ahead of the EGR throttle 44. The variable geometry turbine 48, by controlling the angle of the turbine input vanes, controls the intake manifold pressure via the compressor 46.

The internal combustion engine 20 may be provided with sensors for pressure, temperature, air flow and engine speed. The sensors may include an intake manifold pressure (MAP) sensor, boost pressure sensor, a measured air flow (MAF) sensor, compressor flow sensor, and an engine speed reader. Provided readings from the sensors, other parameters may be estimated, which are referred to as estimators. Estimators may include burnt gas fractions for the intake and exhaust, torque, exhaust temperature, intake temperature, NOx, exhaust pressure, turbine speed, and air-fuel ratio.

Figure 2:
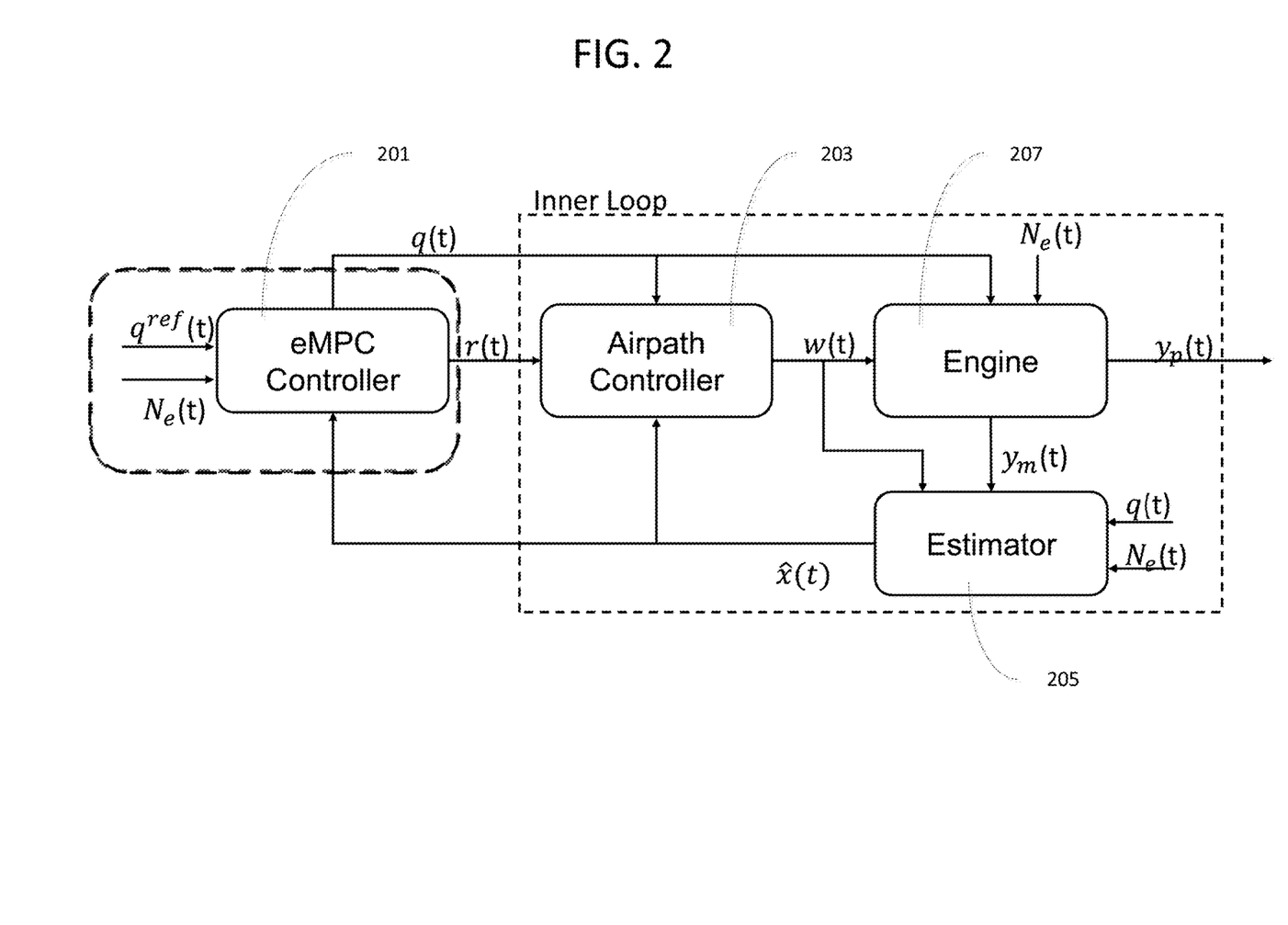
FIG. 2 is a control structure for the internal combustion engine of FIG. 1.

Referring to FIG. 2, a control structure for the internal combustion engine 20 of FIG. 1 may include an engine Model Predictive Controller (eMPC) 201, an airpath controller 203, and an estimator 205 for controlling engine 207. The eMPC 201 receives as input a reference fuel rate $q^{ref}(t)$, engine speed $N_e(t)$ and an estimated state $\hat{x}$ and outputs inner loop targets r, including target intake manifold pressure $p_{im}$ and target EGR rate $x_{egr}$, fuel rate q. The airpath controller 203 controls actuators w, including EGR throttle, EGR valve, variable geometry turbocharger. The Estimator 205 predicts the state of the engine based on a model. The estimated state $\hat{x}$ includes intake manifold pressure $p_{im}$, exhaust manifold pressure $p_{ex}$, compressor flow $w_c$, intake manifold burnt gas fraction $F_1$, and exhaust manifold burnt gas fraction $F_2$. The Estimator 205 receives the state of actuators w and measured outputs of the engine $y_m$, including intake manifold pressure $p_{im}$, compressor flow $w_c$, and NOx concentration θ. The Estimator 205 also receives the fuel rate q and engine speed $N_e$. The engine 207 outputs performance values including efficiency (normalized power) η, NOx concentration θ, fuel air ratio (normalized) φ.

The eMPC 201 controls the EGR valve 40, EGR throttle 44 and variable geometry turbocharger 48. In doing so, the eMPC 201 is subject to emissions requirements (NOx, hydrocarbons, smoke), must supply a torque as requested by a driver, and is expected to conserve fuel (obtain good fuel economy).

It is desired to control drivability and fuel consumption of the internal combustion engine in real-time, using a system embedded in an Engine Control Unit (ECU), which typically is a small microcontroller. In particular, to be effective, the control operation performed by the eMPC controller 201, estimator 205 and airpath controller 203 should be performed during each sampling period in which sensor readings are made.

In an embodiment, the ECU may sample about 100× per second. During a sampling period, the ECU records measurements from sensors, performs optimization calculations, and issues commands. Thus, the ECU preferably performs its required operations within a fixed percentage of the sampling period, referred to as a computational budget.

Generally, a control operation may be considered as being solution of an optimization problem subject to constraints. One way to express an optimal control problem for a discrete time linear-quadratic MPC formulation is as a convex quadratic program (QP).

An aspect is a MPC, where the optimal control problem is solved during each sampling period.

An aspect is a MPC which applies the Fischer Burmeister (FB) function and Newton's method to solving convex QPs, and hereinafter is referred to as Fischer Burmeister Regularized Smoothed (FBRS) approach. FBRS has some properties which make it attractive for embedded optimization. (i) Firstly, FBRS displays global linear convergence and quadratic asymptotic convergence to the solution; properties it inherits from its nature as a damped generalized Newton's method. (ii) It is simple to implement. (iii) Finally, it can be effectively warmstarted when solving sequences of related QPs. In an example implementation, the control program is an embedded C program that is generated from MATLAB code.

Figure 3:
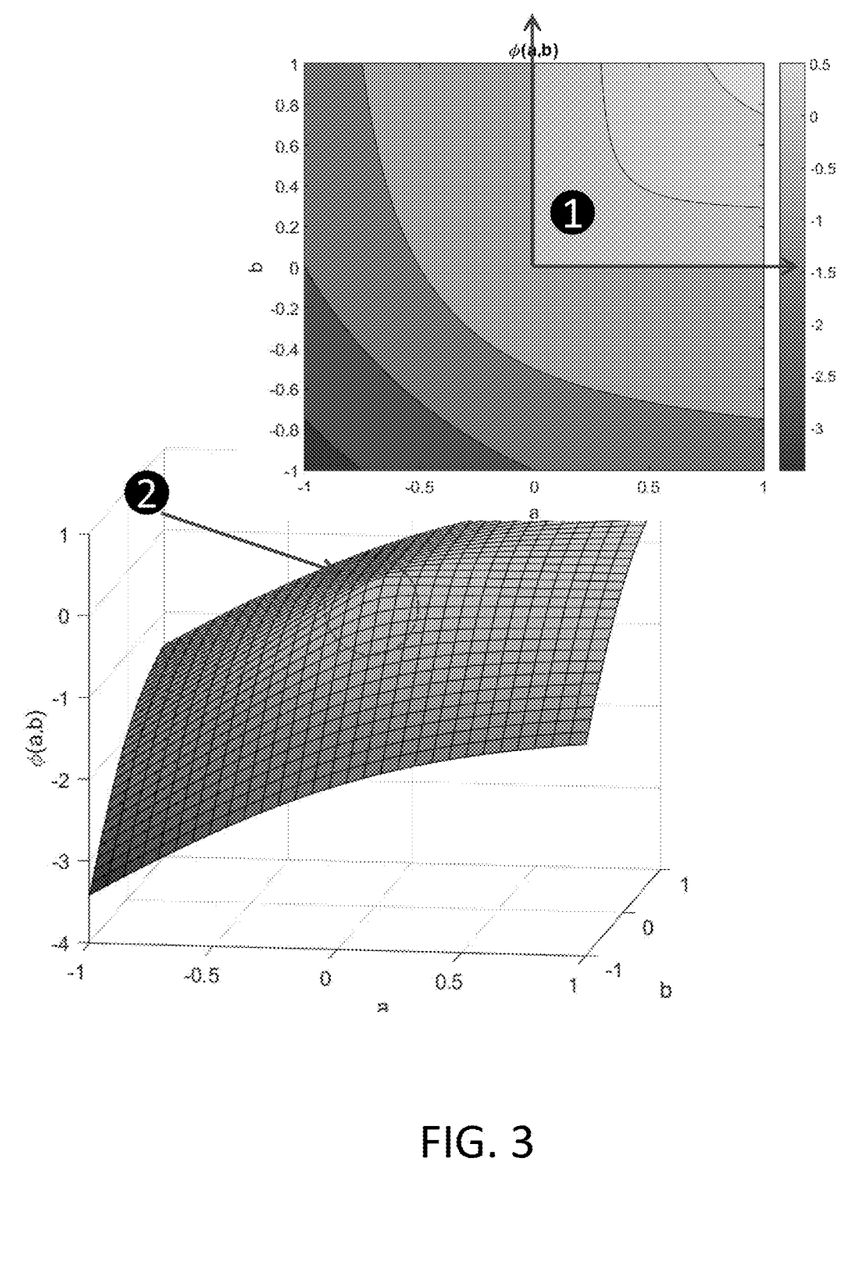
FIG. 3 is a graph of a Fischer-Burmeister function.

As shown in FIG. 3, it has been determined that the FB function may get stuck in a "kink" at (0,0) where it is not differentiable. The FBRS approach avoids this "kink" and guarantees convergence to a solution. In addition, FBRS includes practical improvements such as regularization to handle ill-conditioned Jacobians, and the use of the C-differential to ease the computation of generalized derivatives.

Figure 4:
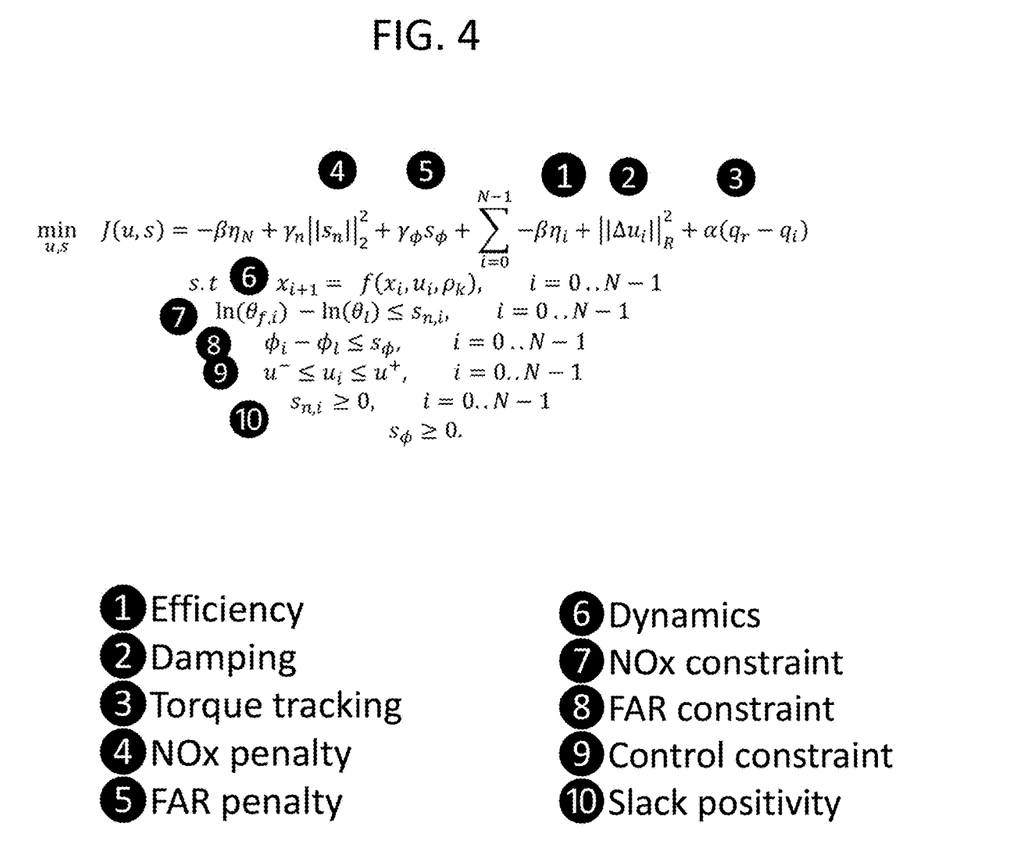
FIG. 4 shows a mathematical representation of the eMPC optimization problem.

Regarding FIG. 4, a mathematical representation of the eMPC optimization problem is shown. Control parameters that may be included in the main function include engine efficiency η, a damping factor based on a damping matrix R, a torque tracking factor $\alpha(q_r - q_i)$, a NOx penalty, and a fuel-air ratio penalty. The main function may be subject to constraints. The constraints may include model dynamics, a NOx constraint, a fuel-air ratio constraint, a set of control-related constraints, and slack. The set of control-related constraints may include a target intake manifold pressure $P_{im}$, a target EGR rate x and a fuel rate q.

In the mathematical representation, α, β, γ represent tuning gains, η represents engine efficiency (normalized power), s represents slack, R represents a damping matrix, u represents a set of stacked controls, and q represents a fueling rate. Further, x represents a differential state of the controller model, which may include a set of intake manifold pressure $pi_m$, exhaust pressure $p_{ex}$, compressor flow $\omega_c$, intake manifold burnt gas fraction $F_1$, exhaust manifold burnt gas fraction $F_2$, and filtered NOx $\theta_f$. ρ represents an operating point for a target fuel rate and engine speed. $\phi_l$ and $\theta_l$ are limits on fuel air ratio and NOx, respectively.

Figure 5:
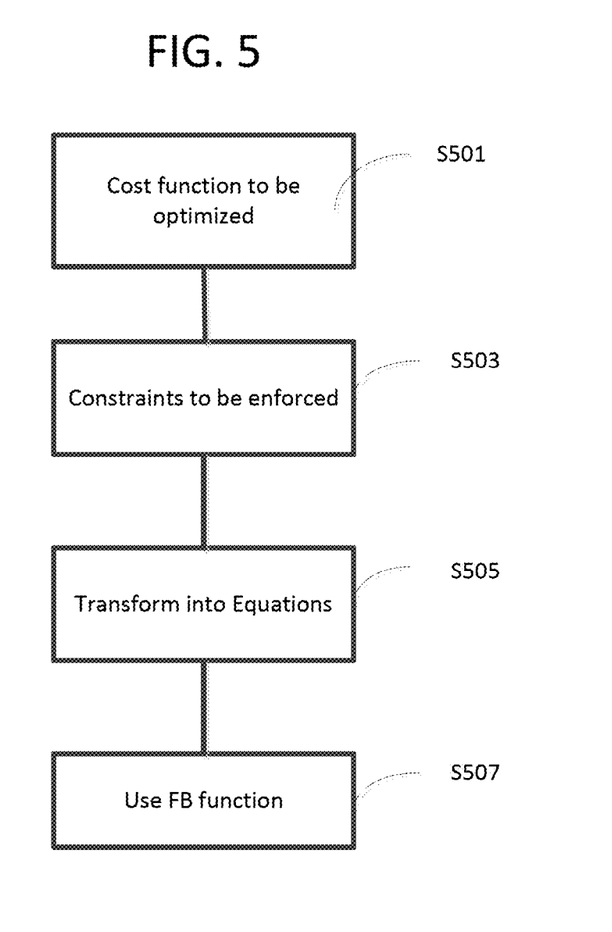
FIG. 5 shows a flowchart for a method of obtaining equations related to the eMPC optimization problem.

Regarding FIG. 5, in order to solve the eMPC optimization problem, in S501 the main function in FIG. 4 is set as the cost function to be optimized. In S503, the constraints are set constraints to be enforced. In S505, the cost function and constraints are transformed using linear approximation to obtain a quadratic program (QP), which in S507 is to be solved using FBRS. An example QP in S505 is of the form $$\min(z) z^T H z + f^T z, \text{ subject to } Az \le b,$$

where $H \in S^n$ is the Hessian matrix, $f \in \mathbb{R}^n$, $z \in \mathbb{R}^n$, $A \in \mathbb{R}^{q \times n}$, $b \in \mathbb{R}^q$. For simplicity the QP may be for the case where there are no equality constraints; one of ordinary skill would understand that the extension to equality and inequality constrained problems is straightforward. For this example, the Karush-Kuhn-Tucker (KKT) conditions for the QP are:

$$Hz+f+A^Tv=0$$

$$v^Ty=0$$

$$v \geq 0, \; y \geq 0$$

The variable z represents control actions, particularly those that minimize the cost function. The variable v represents sensitivities, which are internal variables calculated in the system that quantify how sensitive the cost function is to the constraints. The variable $y=b-Az$ represents constraint margin. If y is positive, the constraints are satisfied. If y is negative, the constraints are not satisfied.

In order to solve the conditions for optimality using the FB function, S507, the conditions are rewritten as a function $F(x)$ using the FB transform. For example, the complementarity conditions $v \geq 0$, $y \geq 0$, $y^Tv=0$ are replaced with FB equations $\phi(y,v)$, where $x=(z, v)$ and $y=b-Az$. Applying the FB function to the complementarity conditions in yields the following nonlinear mapping, $$F_\varepsilon(x) = \begin{bmatrix} Hz + f + A^T v \\ \phi_\varepsilon(v, y) \end{bmatrix}.$$

Because of the properties of FB functions, the function $F(x)$ has the property that $F(x)=0$ if and only if x satisfies the KKT conditions.

The FBRS algorithm functions by approximate solving a sequence of problems $F_{\varepsilon_j}(x_j)=0$ using Newton's method for a decreasing sequence $\varepsilon_j \to 0$ and is in this way similar to other homotopy methods, such as the interior point method (IPM). However, unlike an interior point method, the subproblems do not become ill-conditioned or difficult to solve as $\varepsilon_j \to 0$, in fact $\varepsilon_j$ can be set to exactly zero after a finite number of homotopy steps.

The mapping $F(x)$ is single-valued but is not continuously differentiable; however, $F(x)$ is semismooth so a semismooth Newton's method can be applied to the rootfinding problem $F(x)=0$. If F is smoothed ($\varepsilon>0$) then $F_\varepsilon(x)$ is continuously differentiable so (regular) Newton's method is applicable.

Figure 6:
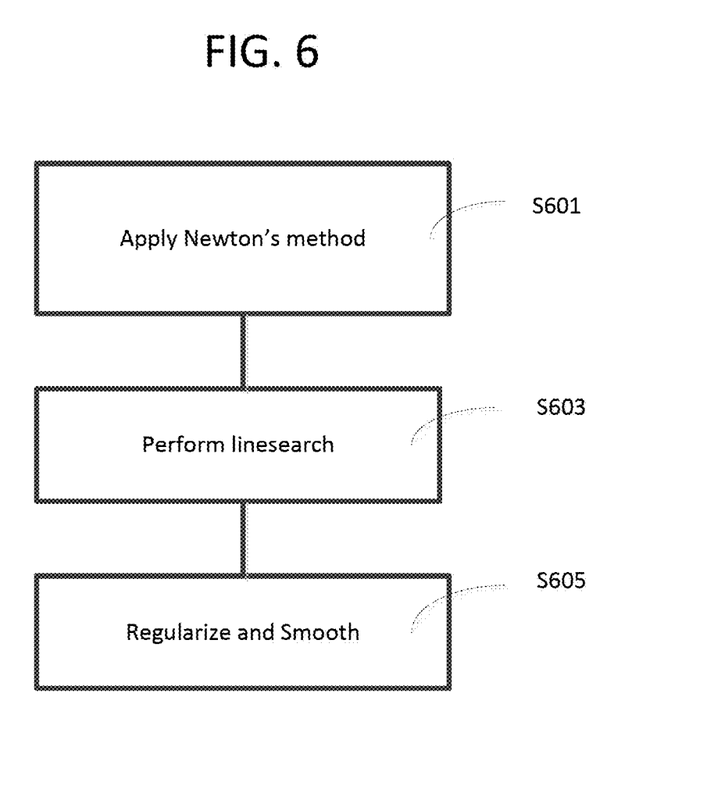
FIG. 6 shows a flowchart for the Regularized Smoothed Fischer-Burmeister method.

Regarding FIG. 6, to solve $F(x)=0$, at S601 a semismooth Newton's method is applied, which yields an iteration $$x_{k+1}=x_k-t_kV_k^{-1}F_{\varepsilon_k}(x_k),$$

where $V_k \in \partial_C F_{\varepsilon_k}(x_k)$ and $t_k \in (0,1]$ is a steplength chosen by, at S603, a linesearch to enforce convergence in a case of being far from a solution. The iteration matrix or Jacobian $V_k$ is always non-singular for any $\varepsilon>0$ but may become ill-conditioned if $\varepsilon$ is small. To remedy the situation, at S605, a proximal regularization term is added to help control numerical conditioning; the regularized and smoothed equations are defined as $$F_{\varepsilon,\delta} = F_\varepsilon(x) + R(x, x_k, \delta) = \begin{bmatrix} Hz + f + A^T v \\ \phi_\varepsilon(v, y) + \delta(v - v_k + y - y_k) \end{bmatrix},$$

where $\delta \geq 0$ controls the regularization. The modified Newton iteration is then $$x_{x+1}=x_k-t_kK_k^{-1}F_{\varepsilon_k}(x_k),$$

where $K_k=V_k+\nabla_xR(x_k,\delta)$ is used in place of $V_k$.

The algorithm for FBRS is summarized in Algorithm 1, below, and represents a semismooth Newton's method globalized using a linesearch and homotopy. The merit function used to globalize each step of the algorithm is defined as $$\theta(x)_\varepsilon = \tfrac{1}{2}\|F_\varepsilon(x)\|_2^2,$$

the parameter $\sigma \in (0,0.5)$ encodes how much reduction is required in the merit function. The desired tolerance is denoted $\tau$, and, $\beta \in (0,1)$ controls reduction in the backtracking linesearch. More sophisticated algorithms for computing $t_k$, e.g., polynomial interpolation can be used in place of the backtracking linesearch; however this simple algorithm is effective in practice. See C. T. Kelley, *Iterative methods for optimization*. SIAM, 1999, incorporated herein by reference in its entirety. Typical values for the fixed parameters are $\sigma \approx 10^{-4}$ and $\beta \approx 0.7$.

---

Algorithm 1 FBRS

---

Input: H, A, f, b, $x_0$, $\sigma$, $\beta$, $\tau$, $\delta$, max_iters
Output: x
1: x ← $x_0$
2: $\varepsilon$ ← $\varepsilon_0$
3: $\delta$ ← $\delta_0$
4: for k = 0 to max_iters−1 do
5:    $\delta$ ← min($\delta$,$\|F_\varepsilon(x)\|$)
6:    $\varepsilon$ ← $\varepsilon_k$
7:    if $\|F(x)\| \leq \tau$ then
8:      break;
9:    end if
10:   Solve $K(x,\varepsilon,\delta)\Delta t = -F_\varepsilon(x,\varepsilon)$
11:   t ← 1
12:   while $\theta_\varepsilon(x + r\Delta x) \geq t(1 - 2\sigma)\theta_\varepsilon(x)$ do
13:      t ← $\beta_t$
14:   end while
15:   x ← x + t$\Delta$x
16: end for
17: return x

---

Figure 7:
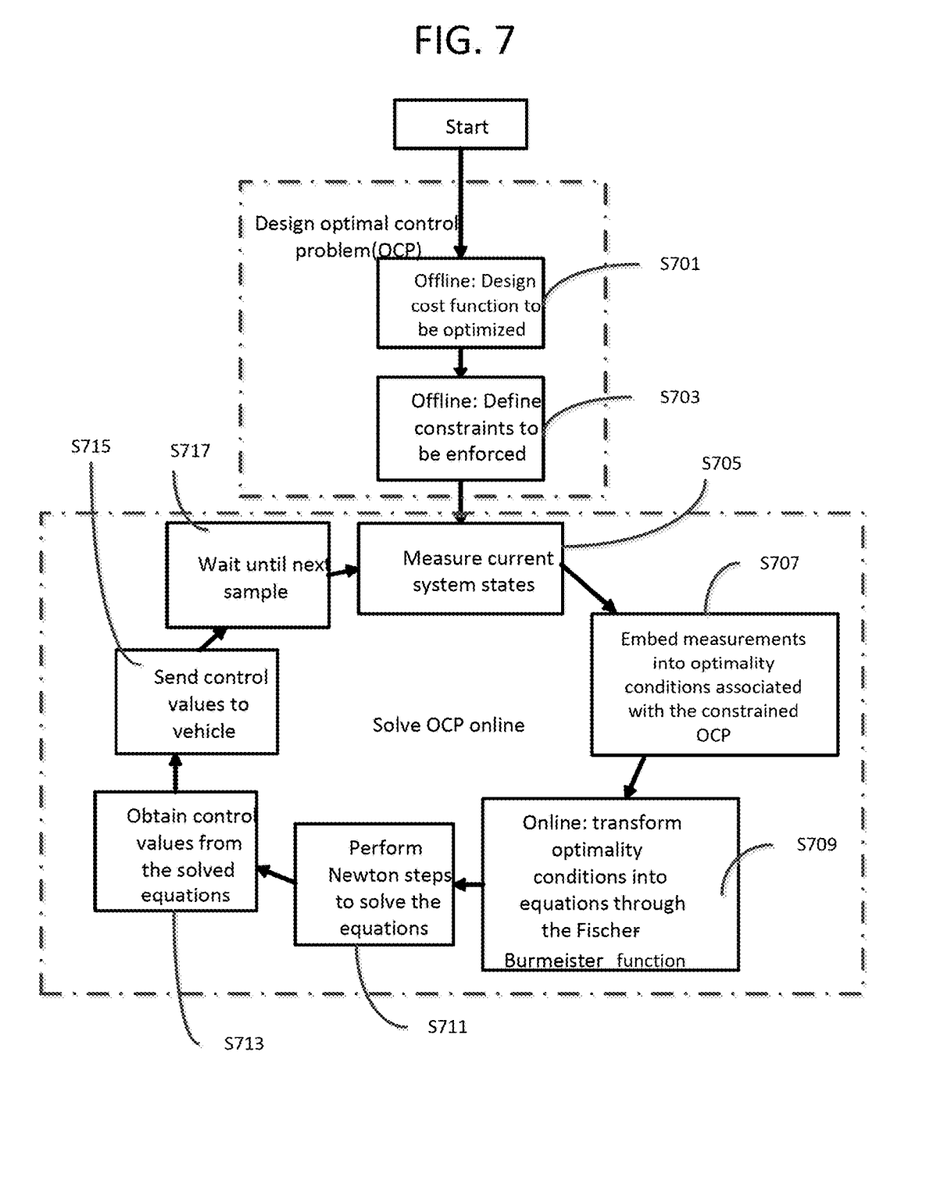
FIG. 7 shows a flowchart for real-time control of an internal combustion engine.

A system which includes the features in the foregoing description provides numerous advantages. In particular, the eMPC described herein can optimize internal combustion engine performance in real-time, at each sensor sampling period. FIG. 7 shows a flowchart for the iterative solution of an engine optimal control in real time. Regarding S701 and S703, the cost function and constraints to be enforced, such as in FIG. 4 may be defined offline, before an engine is installed in a vehicle. In S705, sensor readings are sampled and estimators are calculated in order to measure current engine system states. In S707, the measured system states are embedded into conditions for optimality associated with the constrained optimal control problem. In S709, the optimality conditions are transformed into equations through Fischer-Burmeister function transformation. In S711, iterations are performed using the modified Newton's method to obtain control values in S713. In S715, control values are transmitted to control the engine 207. The remaining time is spent waiting, in S717, until the beginning of the next cycle. Engine optimal control may be performed online using the embedded real-time control problem solver at each sensor sampling period.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for controlling an internal combustion engine, the system comprising:
 a plurality of sensors, each sensor outputting a signal including sensor values measuring engine performance; and
 a controller configured to in each sampling period of the plurality of sensors
  input the sensor values and determine estimators that are calculated based on the sensor values and dynamic models,
  incorporate the sensor values and the estimators into conditions for optimality associated with a constrained optimal control problem,
  apply Fischer-Burmeister function to the conditions for optimality to yield a non-linear mapping,
  smooth the non-linear mapping and apply Newton method iterations to the smoothed non-linear mapping in order to converge on a solution, and
  issue commands that control operation of the internal combustion engine based on the solution.

2. The system of claim 1, further comprising a variable geometry turbocharger, an EGR valve and an EGR throttle, wherein the issued commands control the variable geometry turbocharger, the EGR valve and the EGR throttle during engine operation.

3. The system of claim 1, wherein the smoothed Newton method includes regularization and line search.

4. The system of claim 1, wherein the constrained optimal control problem includes a cost function to be optimized and hard constraints to be enforced.

5. The system of claim 1, wherein the sensor values include one or more of intake manifold pressure, measured air flow, and engine speed, and the estimators include one or more of fractions of burnt gas, torque, exhaust temperature, intake temperature, NOx emissions, exhaust pressure, turbine speed, and air-fuel ratio.

6. The system of claim 4, wherein the hard constraints include one or more of a NOx constraint, a fuel-air ratio constraint, intake manifold pressure target, EGR rate target, and fuel rate while supplying torque to the engine.

7. A method for controlling an internal combustion engine having a controller in communication with a plurality of sensors, each sensor outputting a signal including sensor values measuring engine performance, the method comprising:
 in each sampling period, the controller
  inputting the sensor values and determining estimators that are calculated based on the sensor values and dynamic models,
  incorporating the sensor values and the estimators into conditions for optimality associated with a constrained optimal control problem,
  applying Fischer-Burmeister function to the conditions for optimality to yield a non-linear mapping,
  smoothing the non-linear mapping and applying Newton method iterations to the smoothed non-linear mapping in order to converge on a solution, and
  issuing commands that control the operation of the engine based on the solution.

8. The method of claim 7, wherein the internal combustion engine comprises a variable geometry turbocharger, an EGR valve and an EGR throttle, and
 controlling the variable geometry turbocharger, the EGR valve and the EGR throttle during engine operation using the issued commands.

9. The method of claim 7, wherein the smoothed Newton method includes regularization and line search.

10. The method of claim 7, wherein the constrained optimal control problem includes a cost function to be optimized and hard constraints to be enforced.

11. The method of claim 7, wherein the sensor values include one or more of intake manifold pressure, measured air flow, and engine speed, and the estimators include one or more of fractions of burnt gas, torque, exhaust temperature, intake temperature, NOx emissions, exhaust pressure, turbine speed, and air-fuel ratio.

12. The method of claim 10, wherein the hard constraints include one or more of a NOx constraint, a fuel-air ratio constraint, intake manifold pressure target, EGR rate target, and fuel rate while supplying torque to the engine.

13. A controller for controlling an internal combustion engine when the controller is in communication with a plurality of sensors, each sensor outputting a signal including sensor values measuring engine performance, the controller comprising:
 circuitry configured to, in each sampling period,
  input the sensor values and determine estimators that are calculated based on the sensor values and dynamic models,
  incorporate the sensor values and the estimators into conditions for optimality associated with a constrained optimal control problem,
  map the conditions for optimality to a non-smooth system using Fischer-Burmeister function,
  smooth the non-linear mapping and applying Newton method iterations to the smoothed non-linear mapping in order to converge on a solution, and
  issue commands that control operation of the internal combustion engine based on the solution.

14. The method of claim 13, wherein the smoothed Newton method includes regularization and line search.

15. The method of claim 13, wherein the constrained optimal control problem includes a cost function to be optimized and hard constraints to be enforced.

* * * * *